April 7, 1936.   J. E. OWEN   2,036,824
AZIMUTH DETERMINATION METHOD
Filed Feb. 23, 1935  2 Sheets-Sheet 2
Fig.3.
Fig.4.
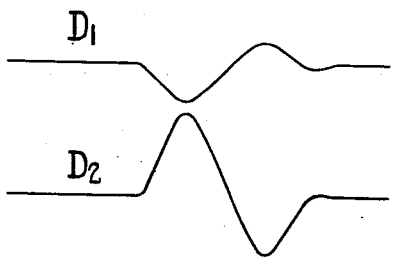
Fig.5.
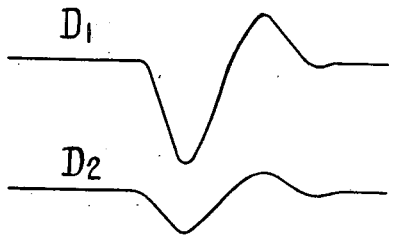
Fig.6
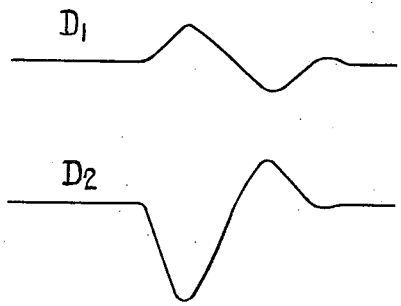
Fig.7.
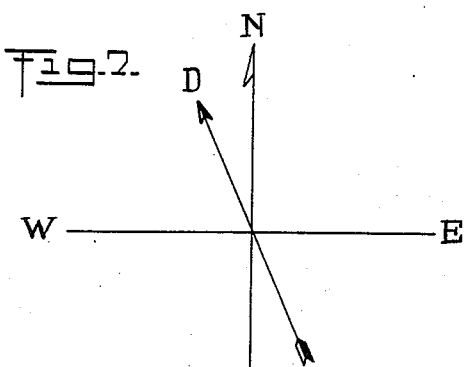
Fig.8.
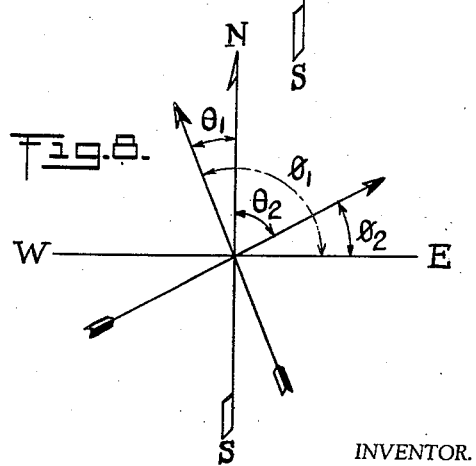
INVENTOR.
John E. Owen
BY
Kenyon & Kenyon
ATTORNEYS.

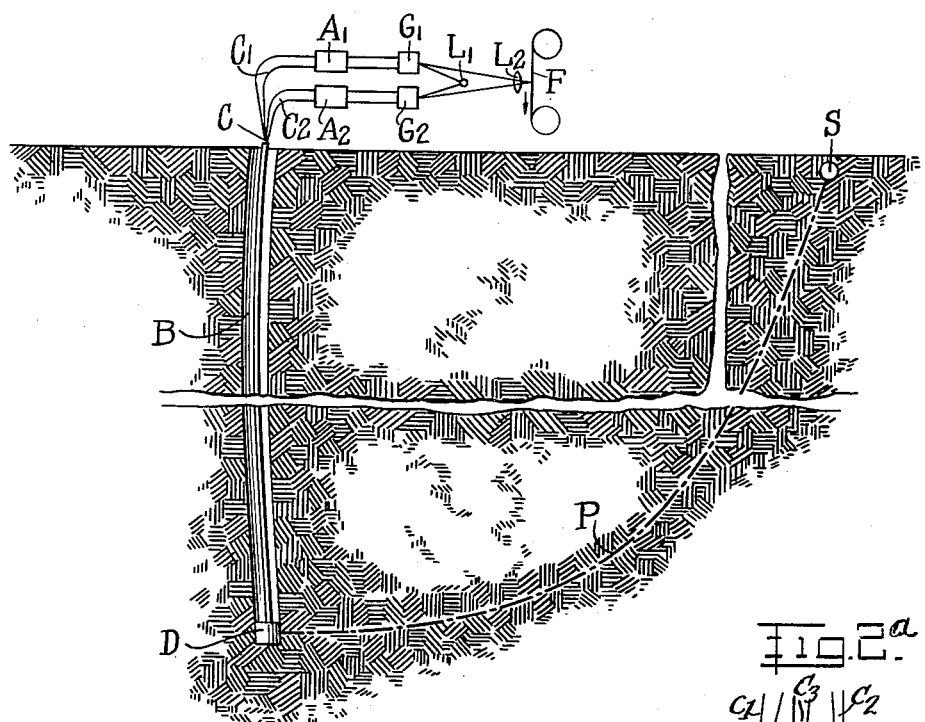
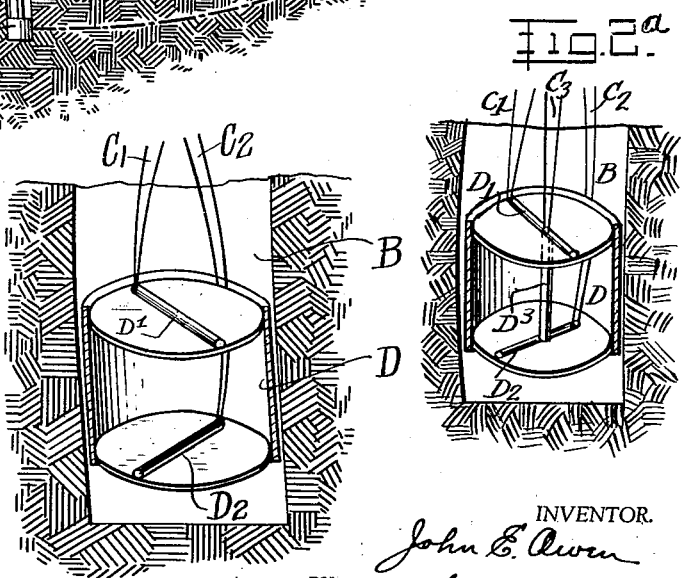

Patented Apr. 7, 1936

2,036,824

UNITED STATES PATENT OFFICE 2,036,824

AZIMUTH DETERMINATION METHOD

John E. Owen, Tulsa, Okla., assignor to Geophysical Research Corporation, New York, N. Y., a corporation of New Jersey Application February 23, 1935, Serial No. 7,769

18 Claims. (Cl. 181—0.5)

This invention relates to the determination of the azimuth of an instrument arranged below the earth's surface, as for example, in a bore hole or in a lake or other body of water.

An object of this invention is an azimuth determination method and means which utilizes the directional characteristics of artificial seismic waves.

According to the invention, the instrument of which the azimuth is to be determined, is equipped with two or more angularly related seismic wave detectors, each of which has only one degree of freedom and hence responds only to the component of motion along its axis. Artificial seismic waves are produced at a point on the earth's surface and records are made of the response of the detectors. By comparison of the response records of the detectors, determination may be made of the azimuth of the instrument.

Other objects, novel features and advantages of this invention will become apparent from the following specification and accompanying drawings, wherein:

Fig. 1 is a diagrammatic view of the apparatus used in practicing the invention;

Fig. 2 is an enlarged view of the instrument with wave detectors attached;

Fig. 2a is a view similar to Fig. 2 of a modification;

Figs. 3, 4, 5 and 6 illustrate records of the response of the several detectors to the seismic waves, and Figs. 7 and 8 illustrate orientation graphs.

Referring now to Figs. 1 and 2, B designates a bore hole in the earth in which is arranged an instrument D, the azimuth of which is to be determined. As shown in Fig. 2, the instrument D is equipped with two wave detectors $D_1$ and $D_2$, each of which has one degree of freedom and hence responds only to the component of motion along its axis. These detectors preferably are arranged at right angles to each other and preferably are so mounted that they always remain horizontal. Any suitable means (not shown) may be provided for maintaining the detectors in horizontal position.

The wave detectors are of any of the well-known types which translate mechanical vibrations into electrical vibrations and are connected through the cable C by conductors $C_1$ and $C_2$ with amplifiers $A_1$ and $A_2$. The outputs of the amplifiers are impressed upon the galvanometers $G_1$ and $G_2$ which are used in connection with the light source $L_1$ and lens $L_2$ to effect photographic registration in separate channels on the moving film F of the response of each wave detector. Any suitable means may be provided to make the recording channels of equal sensitivity.

In the practice of the method, seismic waves are artificially produced at a point S near the earth's surface, preferably by detonation of a charge of dynamite. Waves travel from the source S to the instrument D along the path P and are received by the detectors $D_1$ and $D_2$ and recorded on the film F.

Preferably, the wave source S is arranged sufficiently distant from the mouth of the bore hole that the wave arriving at the instrument in the bore hole is traveling approximately horizontally. The curved path that gives the approximately horizontal wave results from an increase in velocity with depth which normally occurs within the top few thousand feet of the earth's surface.

Fig. 3 illustrates a typical record obtained by the method above described and presents a set of conditions by which may be determined the azimuth of the instrument D.

Assume that the maximum amplitude in the record made by detector $D_1$ is five units and by $D_2$ is two units. Hence, the angle between the axis of $D_1$ and the path of the wave is:

$$\text{arc cos} \frac{5}{\sqrt{2^2+5^2}} = 22°$$

while the angle between the axis of $D_2$ and the wave is:

$$\text{arc cos} \frac{2}{\sqrt{2^2+5^2}} = 68°.$$

Since the position of the wave source S and hence the direction of travel of the recorded wave is known, the azimuth of D may be determined. Arbitrarily assuming the axis of reference in the instrument D as the axis of the detector $D_1$ and assuming the source S to be located due north of the bore hole, the azimuth of D is as shown in Fig. 7.

Fig. 4 illustrates a record made with D occupying the same position as for Fig. 3, but with the source S due east of the bore hole. It is to be noted that now the amplitude of $D_2$ has increased and that of $D_1$ has decreased and reversed its direction. Similarly, Fig. 5 represents the case in which the source S is located due south of the bore hole and Fig. 6 illustrates the case in which S is located due west of the bore hole. These illustrations are given to show how the invention utilizes both the amplitudes and the directions of the recorded waves. It is to be noted that the absolute amplitudes of the recorded waves are of no significance as the angle is determined by the relative amplitude of the recorded waves.

The procedure just described is predicated upon equal sensitivity of the two recording channels. However, the azimuth of the instrument may be determined according to the method even though the predicated condition does not exist. Assume for convenience, that when the point S is due north of the bore hole, it has been found that the response of $D_1$ measures plus six units and the response of $D_2$ measures plus three units and that with S due east of the bore hole, it is found that the response of $D_1$ measures minus two units and the response of $D_2$ measures plus five units. Sufficient data are available from these records to determine the azimuth of D.

Let $\theta_1$ be the angle between the north-south wave path and the axis of $D_1$ and similarly $\theta_2$ the angle between $D_2$ and said path. Assume that the sensitivity of $D_2$ as previously defined is $1/K$ times that of $D_1$. This gives:

$$\cos \theta_1 = \frac{6}{\sqrt{6^2 + (3K)^2}}$$

$$\cos \theta_2 = \frac{3K}{\sqrt{6^2 + (3K)^2}}$$

Let $\phi_1$ be the angle between the east-west wave path and the axis of $D_1$ and similarly $\phi_2$ the angle between $D_2$ and the path. This gives:

$$\cos \phi_1 = \frac{-2}{\sqrt{(-2)^2 + (5K)^2}}$$

$$\cos \phi_2 = \frac{5K}{\sqrt{(-2)^2 + (5K)^2}}$$

The relations of the angles are as shown in Fig. 8 and $$\phi_1 = \theta_1 + 90°$$

Hence, $$\cos \phi_1 = -\sin \theta_1$$

or $$\sin \theta_1 = \frac{2}{\sqrt{4 + 25K^2}}$$

Also, $$\cos \theta_1 = \frac{6}{\sqrt{36 + 9K^2}}$$

Solving $K^2 = 0.80$ and, $\theta_1 = 24°$

While it is preferable that the detectors $D_1$ and $D_2$ be mounted in such a way that they will remain horizontal in the bore hole, this requirement may be dispensed with if means are provided to determine the dip of the axes of $D_1$ and $D_2$. The dip may be determined by providing the instrument D with a third detector $D_3$ arranged at right angles to both $D_1$ and $D_2$. Fig. 2a discloses an instrument equipped with three detectors arranged as just described. The determination for the dip is then supplied in the calculations of the azimuth of the instrument D. Other suitable means may be used to determine the dip.

Also, while it is preferable that the source S be placed at a sufficient distance from the mouth of the bore hole that the wave arriving at D will be practically horizontal, yet the method may be used when this condition is not met. It is possible by use of the theory of wave propagation in a solid to calculate the actual direction of the wave received by the detectors, and make corresponding adjustments in the response amplitudes. The method is thus capable of use with S located near the bore hole and with the wave having an appreciable vertical component. Furthermore, while the drawings have illustrated the recording equipment as being located outside the bore hole, such arrangement is not essential to the method and the recording equipment may be placed at any suitable location and may be of any construction which will suitably record the response of the detectors.

I claim:

1. The method of determining the azimuth of an instrument below the earth's surface which comprises producing a source of artificial seismic waves in the earth, receiving at the instrument wave components having fixed directional relation to said instrument and individually recording said wave components.

2. The method of determining the azimuth of an instrument below the earth's surface which comprises producing a source of artificial seismic waves in the earth, receiving at the instrument three wave components having fixed directional relation to said instrument and individually recording said wave components.

3. The method of determining the azimuth of an instrument below the earth's surface which comprises producing a source of artificial seismic waves in the earth, receiving at the instrument wave components having right angle relation to each other and fixed directional relation to said instrument and individually recording said wave components.

4. The method of determining the azimuth of an instrument below the earth's surface which comprises producing a source of artificial seismic waves in the earth, receiving at the instrument three wave components having right-angle relation to each other and fixed directional relation to said instrument and individually recording said wave components.

5. The method of determining the azimuth of an instrument below the earth's surface which comprises producing a source of artificial seismic waves in the earth at a point sufficiently removed from the instrument that the seismic wave reaching the instrument is traveling substantially horizontal, receiving at the instrument wave components having fixed directional relation to said instrument and individually recording said wave components.

6. The method of determining the azimuth of an instrument below the earth's surface which comprises producing a source of artificial seismic waves in the earth at a point sufficiently removed from the instrument that the seismic wave reaching the instrument is traveling substantially horizontal, receiving at the instrument horizontal wave components having fixed directional relation to said instrument and individually recording said wave components.

7. The method of determining the azimuth of an instrument below the earth's surface which comprises producing a source of artificial seismic waves in the earth at a point sufficiently removed from the instrument that the seismic wave reaching the instrument is traveling substantially horizontal, receiving at the instrument wave components having right angle relation to each other and fixed directional relation to said instrument and individually recording said wave components.

8. The method of determining the azimuth of an instrument below the earth's surface which comprises producing a source of artificial seismic waves in the earth at a point sufficiently removed from the instrument that the seismic wave reaching the instrument is traveling substantially horizontal, receiving at the instrument horizontal wave components having right angle relation to each other and fixed directional relation to said instrument and individually recording said wave components.

9. The method of determining the azimuth of an instrument below the earth's surface which comprises producing a source of artificial seismic waves in the earth, receiving waves by detectors fixed to said instrument and each having one degree of freedom, and individually recording the output of each detector.

10. The method of determining the azimuth of an instrument below the earth's surface which comprises producing a source of artificial seismic waves in the earth, receiving waves at said instrument by detectors having a single line response and fixed to said instrument with the response lines at right angles, and individually recording the outputs of said detectors.

11. The method of determining the azimuth of an instrument below the earth's surface which comprises producing a source of artificial seismic waves in the earth, receiving waves by three detectors having single line response and fixed to said instrument with the response lines at right angles to each other, and individually recording the outputs of said detectors.

12. The method of determining the azimuth of an instrument below the earth's surface which comprises producing a source of artificial seismic waves in the earth at a point sufficiently removed from the instrument that the seismic waves reaching the instrument are traveling substantially horizontally, receiving said waves at the instrument by detectors having single line response and fixed to the instrument with their response lines at right angles to each other, and separately recording the outputs of said detectors.

13. The method of determining the azimuth of an instrument below the earth's surface which comprises producing a source of artificial seismic waves in the earth at a point sufficiently removed from the instrument that the seismic waves reaching the instrument are traveling substantially horizontally, receiving said waves at said instrument by detectors having single line response and arranged with their response lines horizontal at right angles to each other, and separately recording the outputs of said detectors.

14. Means for determining the azimuth of an instrument below the earth's surface comprising two wave detectors fixed to said instrument and each having one degree of freedom, and means connected to said detector for individually recording the output thereof.

15. Means for determining the azimuth of an instrument below the earth's surface comprising a pair of wave detectors, each having one degree of freedom and being fixed to said instrument with their corresponding axes mutually perpendicular and means connected to said detector for individually recording the outputs thereof.

16. Means for determining the azimuth of an instrument below the earth's surface comprising three wave detectors, each having one degree of freedom and being fixed to said instrument with their corresponding axes mutually perpendicular, and means connected to said detectors for individually recording the outputs thereof.

17. Means for determining the azimuth of an instrument below the earth's surface comprising a pair of wave detectors having uni-linear response, said detectors being horizontally attached to said instrument with their response line at right angles to each other, and means connected to said detectors for individually recording the outputs thereof.

18. Means for determining the azimuth of an instrument below the earth's surface comprising a pair of wave detectors having uni-linear response, said wave detectors being horizontally attached to said instrument with their response lines at right angles to each other, a third wave detector having a uni-linear response and being vertically attached to said instrument, and means connected to said detectors for individually recording the outputs thereof.

JOHN E. OWEN.